United States Patent [19]
McLaughlin et al.

[11] Patent Number: 5,687,243
[45] Date of Patent: Nov. 11, 1997

[54] NOISE SUPPRESSION APPARATUS AND METHOD

[75] Inventors: Michael J. McLaughlin, Palatine; Tenkasi V. Ramabadran, Naperville, both of Ill.

[73] Assignee: Motorola, Inc., Schaumburg, Ill.

[21] Appl. No.: 536,231

[22] Filed: Sep. 29, 1995

[51] Int. Cl.$^6$ .................................................. H04B 15/00
[52] U.S. Cl. ............................................................ 381/94.3
[58] Field of Search ................................ 381/94, 71, 98, 381/103

[56] References Cited

U.S. PATENT DOCUMENTS 4,811,404  3/1989  Vilmur et al. .

OTHER PUBLICATIONS

Leland B. Jackson, Digital Filters and Signal Processing, 1989, pp. 138–167.

*Primary Examiner*—Forester W. Isen
*Attorney, Agent, or Firm*—Susan L. Lukasik

[57] ABSTRACT

A signal that includes noise (301) is sampled to provide a plurality of digital information samples (303). A predetermined number of the digital information samples are grouped as a set (305). Noise suppression is performed on the signal using the following steps. One or more digital representations of silence is attached to the set, forming an extended set (401). A Fourier transform is performed on the extended set, yielding a set of frequency domain coefficients (403), at least some of which are scaled (405). An inverse Fourier transform is performed on the set of scaled frequency domain coefficients to provide a set of time domain samples (407), which are partially overlapped in time and added with a previously formed set of time domain samples (409 and 411), which result is provided with the non-overlapping time domain samples as a noise suppressed version of the signal (413).

18 Claims, 2 Drawing Sheets

NOISE SUPPRESSION APPARATUS AND METHOD

FIELD OF THE INVENTION

This invention relates to voice processing, including but not limited to suppression of noise in voice signals.

BACKGROUND OF THE INVENTION

In voice communication systems, voice as well as any audio background noise present are transmitted to the receiver. In environments with high audio background noise at the transmitter, the presence of the background noise in the recovered audio signal can be very disturbing to the listener at the receiver. It is therefore desirable to have audio noise suppression to attenuate background sounds prior to the transmission of the voice signal.

In a digital communication system, the voice signal is encoded into a digital data stream prior to transmission. In many such systems, the encoding is accomplished with the use of a digital speech coding system to minimize the required transmitted data rate. Some digital speech coding systems allow for lower data rate transmission by basing the coding upon the unique characteristics of a voice signal. If, however, noise is input to this type of speech coder, the speech coder will alter the noise signal until it approximates some sort of speech signal. The unfortunate result of this approximation is that the background noise can be changed to a signal which possesses a significantly different perceptual characteristic. Often, this reproduced signal can be more irritating to the listener than the original background noise. For some digital speech coding systems, a warbling type of sound that does not resemble the noise that was originally input to the speech coder can occur. Because background noise may be present between talk spurts, unsuppressed background noise will cause the warbling to be present during speech pauses. The presence of warbling results in a reproduced signal which is subjectively undesirable to the listener.

Noise suppression is used in speech communication systems in order to improve the overall voice quality by reducing the environmental background noise (e.g., from a car engine) from the desired speech signal. One of the popular techniques used for this purpose is spectral subtraction. With this technique, the input signal (speech plus noise) is analyzed into different frequency bands, a gain is applied to the signal corresponding to each band, and the gain scaled signals are combined to produce the output signal. The gain applied to each band is time varying and depends on the background noise level, the desired amount of suppression, and the signal to noise ratio (SNR) in that band. U.S. Pat. No. 4,811,404, issued on Mar. 7, 1989 to Vilmur et al., and titled "Noise Suppression System" discloses such a noise suppression system, which patent is enclosed herein by reference. This type of noise suppression may cause distortion to the signal beyond the noise it is trying to suppress. The bank of bandpass filters used for the spectral analysis of the input speech signal is a source of distortion for the speech signal and causes the output speech to be distorted even when the input noise is low, and no noise suppression is applied.

Accordingly, there is a need for a noise suppression system that does not add distortion while suppressing background noise from encoded speech.

DESCRIPTION OF A PREFERRED EMBODIMENT

The following describes an apparatus for and method of noise suppression for background noise within a speech signal. Distortion caused by the filters used in spectral subtraction noise suppression system is removed, inter alia, by using a Fourier transform/inverse Fourier transform in combination with an overlap and add filtering technique.

Figure 1:
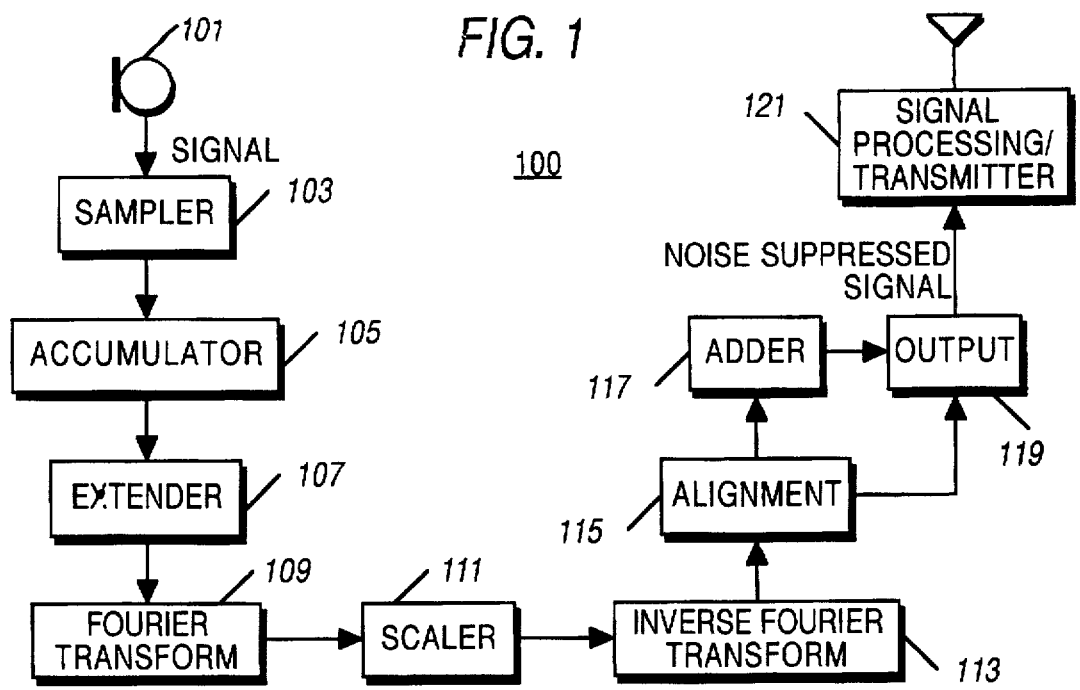
FIG. 1 is a block diagram of a radio including a noise suppression system in accordance with the invention.

A radio 100 including a noise suppression system within a radio 100 is shown in FIG. 1. A microphone 101, or other type of voice transducer, receives a voice signal with noise. The output of the microphone 101 is a signal, which is input into a sampler 103. In the preferred embodiment, the signal is an analog signal that is sampled at 8000 samples per second. The sampler 103 outputs digital information samples to an accumulator 105. The accumulator 105 provides a predetermined number of the digital information samples as a set. In the preferred embodiment, the predetermined number is 80 digital information samples per set. This set of digital information samples is output to an extender 107. The extender 107 provides an extended set by attaching at least one digital representation of silence to the set. In the preferred embodiment, a digital representation of silence is appended both before and after the set of digital information samples. See FIG. 2, for more details on the specific composition of the sample fields. The extender 107 outputs the extended set to a Fourier transform unit 109. In the preferred embodiment, the size of the extended set is 128. The Fourier transform unit 109 performs a Fourier transform on the extended set and outputs a set of frequency domain coefficients. In the preferred embodiment, a fast Fourier transform (FFT) is performed.

The output of the Fourier transform unit 109 is input to a scaler 111. The scaler receives the set of frequency domain coefficients and outputs a set of scaled frequency domain coefficients. The scaler 111 may use one or more different scaling coefficients to scale the frequency domain coefficients. The scaler 111 outputs a set of scaled frequency domain coefficients to an inverse Fourier transform unit 113. The inverse Fourier transform unit 113 performs an inverse Fourier transform on the set of scaled frequency domain coefficients and outputs a set of time domain samples to an alignment unit 115. In the preferred embodiment, the inverse Fourier transform is an inverse fast Fourier transform (IFFT).

The alignment unit 115 takes the set of time domain samples and provides at least one pair of overlapping time domain samples by partially overlapping in time the set of time domain samples with a previously formed set of time domain samples, thereby producing at least one pair of overlapping time domain samples. In the preferred embodiment, the last 48 samples of the previously formed set of time domain samples are overlapped with the first 48 samples of the current set of time domain samples, thereby producing 48 pairs of overlapping time domain samples. The overlapping time domain samples are input into an adder 117, which adds together the information in each pair of overlapping time domain samples, thereby providing at least one composite time domain sample. In the preferred embodiment, the 48 samples of the previously formed set of time domain samples are added together with the 48 samples of the current set of time domain samples, thereby providing 48 composite time domain samples. The alignment unit outputs the non-overlapping samples from the time domain samples to an output unit 119. In the preferred embodiment, the alignment unit 115 outputs to the output unit 119 the first 32 samples of the time domain samples which do not overlap with the previously formed set of time domain samples. Also in the preferred embodiment, the alignment unit 115 stores the last 48 samples of the aligned time domain samples for future use as the previously formed set of time domain samples to be overlapped with the next aligned time domain signal. The adder outputs the composite time domain samples to the output unit 119, which takes the non-overlapping time domain samples (in the preferred embodiment, the 32 non-overlapping time domain samples from the alignment unit) from the alignment unit 115 and the composite time domain samples from the adder 117 and outputs a noise suppressed version of the signal. In the preferred embodiment, the noise suppressed signal comprises the 48 overlapped and added samples from the two sets of time domain samples as well as the 32 samples of non-overlapping time domain samples that follow the first 48 samples in time from the current set of time domain samples and provides the resulting signal as a noise suppressed version of the signal output by the microphone 101. The 80 samples correspond to the 80 samples from the accumulator 105 (with a 24 sample delay). In the preferred embodiment, the noise suppression unit is disposed in a communication unit 100. In particular, the communication unit is a radio. In the preferred embodiment, the noise suppressed signal is input to a signal processing/transmitter 121, which performs the remaining necessary processing required to transmit the signal at a radio frequency by an antenna, e.g., speech coding, radio frequency modulation, and power amplification.

Figure 2:
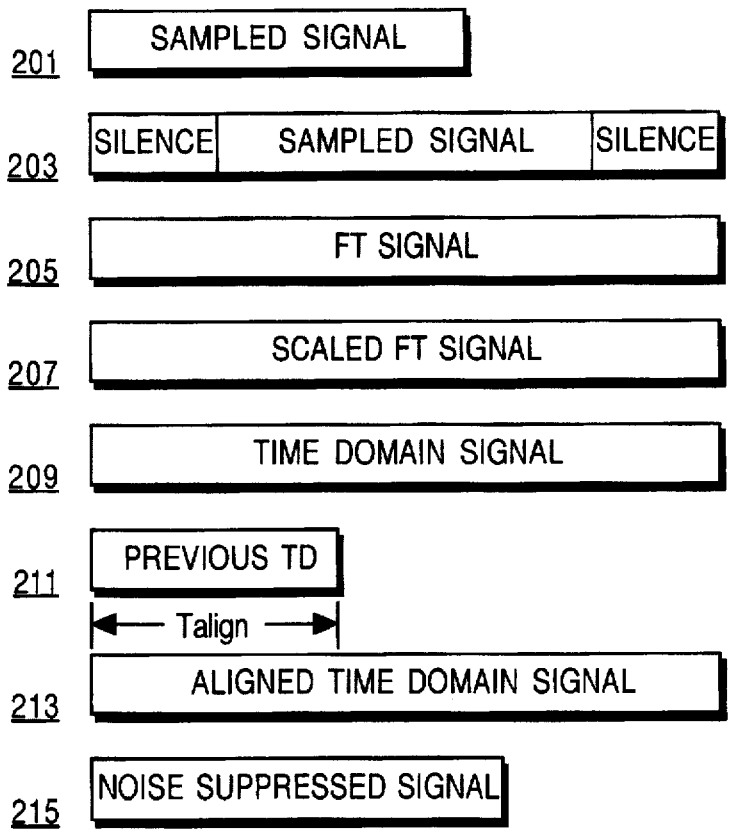
FIG. 2 shows sample field representations of the various stages of a noise suppression system in accordance with the invention.

Sample field representations of the various stages of the noise suppression system in accordance with the present invention are shown in FIG. 2. The sampled signal as received from the accumulator 105 is shown in sample field 201. In the preferred embodiment, there are 80 samples of temporally contiguous digital information samples in this sample field 201. Sample field 203 represents the samples with digital representations of silence appended to the beginning and end of the sampled signal In the preferred embodiment, there are 24 samples of silence preceding the sampled signal and 24 samples of silence succeeding the sampled signal. Also in the preferred embodiment, the silence is represented by zero-valued samples. Sample field 203 is the output from the extender 107. Sample field 205 is a Fourier transformed version of field 203, as produced by the Fourier transform unit 109. In the preferred embodiment, the Fourier transform signal in field 205 is comprised of 128 coefficients. The scaler 111 outputs field 207, which is a scaled version of field 205. Sample field 209 is an inverse Fourier transformed version of field 207, as produced by the inverse Fourier transform unit 113. In the preferred embodiment, the inverse Fourier transformed signal in field 209 is comprised of 128 time domain (TD) samples.

Sample field 211 is a previous time domain signal. The previous time domain signal may be the last scaled inverse Fourier transformed signal in time prior to the current signal portion being processed. If this is the first signal portion being processed for a particular message, the previous time domain signal may be a default or predetermined set of samples. The time domain signal of sample field 209 is then time aligned by the alignment unit 115, by a period of time $T_{align}$. In the preferred embodiment, $T_{align}$ is 48 samples, which 48 samples correspond to the 24 samples of silence that precede and succeed the sampled signal in field 203, thereby yielding a total of 48 samples added to the signal. In other words, the number of time domain samples in $T_{align}$ is equal to or substantially equal to (within ±10%) the number of time domain samples in the at least one digital representation of silence in sample field 203. Sample field 213 is a time aligned version of field 209 by period of time $T_{align}$, as provided by the alignment unit 115. The adder 117 takes the overlapping samples, in other words, the samples that are in the time aligned period from both the previous time domain signal 211 and the current aligned time domain signal 213, and adds these samples as they match in the time domain. In the preferred embodiment, the result of this adder is 48 samples of -overlapped and added information, which is output to the output unit 119. In the preferred embodiment, the output unit 119 takes 32 of the non-overlapped samples from the aligned time domain sample field 213, i.e., the 32 samples right after the $T_{align}$ time window (which are the same samples as the 32 samples after the first 48 samples from the time domain signal 209), and appends them after the 48 overlapped and added samples, which occur at the beginning of field 215, thereby yielding the noise suppressed signal 215. The number of samples in the noise suppressed signal 215 equals the number of samples in the sampled signal portion of 203, although the noise suppressed signal is delayed in time from the sampled signal which in the preferred embodiment is 24 sample periods. In the preferred embodiment, the last 48 samples of the aligned time domain signal 213 are stored by the alignment unit 115, which stores these 48 samples for future use as the next field 211 to be overlapped with the next aligned time domain signal 213.

Figure 3:
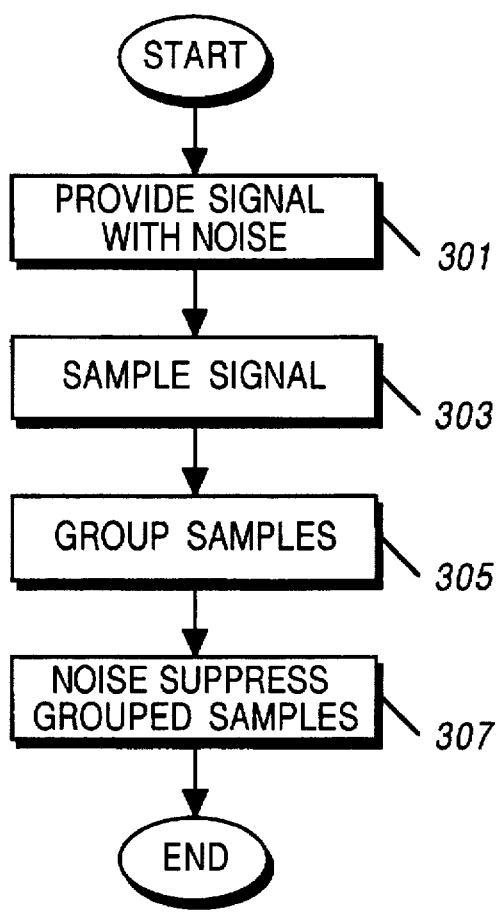
FIG. 3 and FIG. 4 are flowcharts showing noise suppression in accordance with the invention.

A flowchart showing noise suppression is shown in FIG. 3. At step 301, a signal with noise is provided from the microphone or other audio transducer 101. In the preferred embodiment, the signal comprises audio information that includes acoustic noise. At step 303, that signal with noise is sampled by the sampler 103, thereby providing a plurality of digital information samples. At step 305, the sampled signal is grouped by the accumulator 105 into a predetermined number of digital information samples, thereby forming a set. At step 307, the set of digital information samples is noise suppressed in accord with the steps of the flowchart of FIG. 4.

Figure 4:
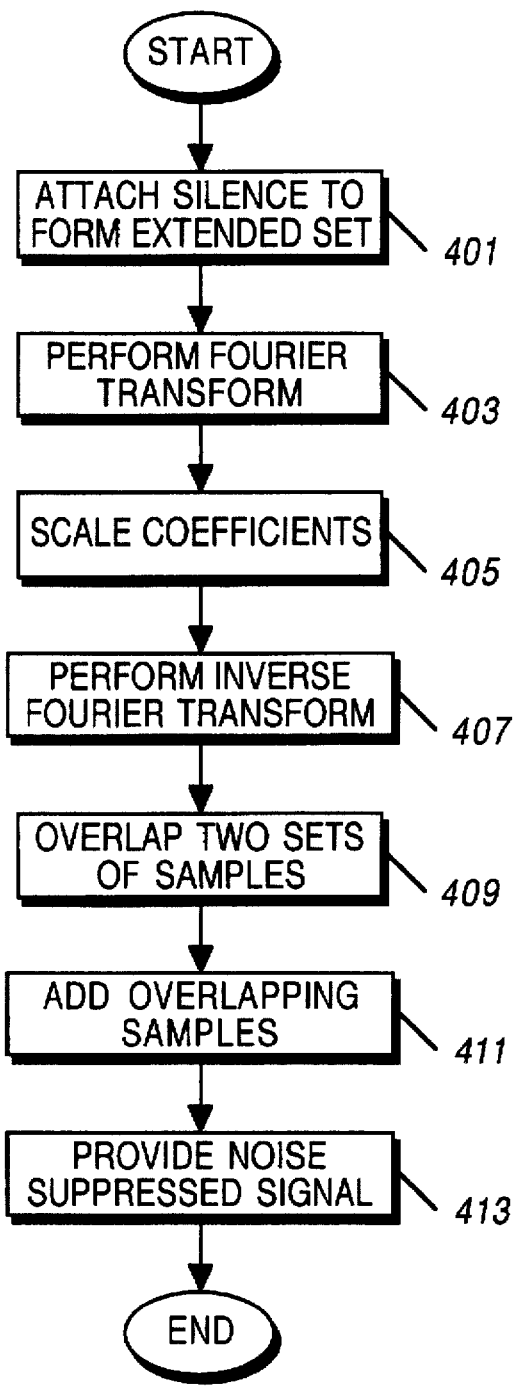

A flowchart showing noise suppression is shown in FIG. 4. At step 401, at least one digital representation of silence is attached by the extender 107 to the set of digital information samples formed in step 305, thereby forming an extended set. In the preferred embodiment, a digital representation of silence is attached before and after the set of digital information samples. At step 403, a Fourier transform is performed by the Fourier transform unit 109 on the extended set to obtain a set of frequency domain coefficients.

At step 405, at least some of the set of frequency domain coefficients are scaled by the scaler 111, thereby providing a set of scaled frequency domain coefficients. The scaler 111 may use one or more different scaling coefficients to scale the frequency domain coefficients. One or more, up to all of the frequency domain coefficients may be scaled. These scaling coefficients may be provided by a spectral subtraction method, such as is known in the art, as taught in U.S. Pat. No. 4,811,404 by Vilmur.

In the Vilmur patent, as shown in FIG. 1, the input signal is separated into a plurality of pre-processed signals representative of selected frequency channels by the channel divider 210 and the gain of each of the plurality of pre-processed signals is modified by channel gain modifier 250 to provide a plurality of post-processed noise suppressed output signals. The calculation of the channel gains (or scaling coefficients) is accomplished by the blocks 220, 420, 310, and 240 and output to the channel gain modifier 250 by the gain smoothing filter 530. In the present invention, the set of frequency domain coefficients provided by the Fourier transform unit 109 can be grouped together to form a plurality of subsets of frequency domain coefficients and each subset of frequency domain coefficients can be regarded as representative of a frequency channel. The channel gain calculation method described in U.S. Pat. No. 4,811,404 can then be used to calculate the gain (or scaling coefficient) for each frequency channel. This channel scaling coefficient can then be used for each frequency coefficient representing that channel. Alternately, the different channel scaling coefficients can be smoothed across frequency values to calculate a unique scaling coefficient for each frequency coefficient.

At step 407, an inverse Fourier transform is performed by the inverse Fourier transform unit 113 on the set of scaled frequency domain coefficients, thereby providing a set of time domain samples. At step 409, the set of time domain samples is partially overlapped in time by the alignment unit 115 with the previously formed set of time domain samples, thereby producing at least one pair of overlapping time domain samples. At step 411, there is at least one pair of overlapping time domain samples that is added by the adder 117, thereby providing at least one composite time domain sample. At step 413, at least some of the non-overlapping time domain samples from step 409 are serially placed after the at least one composite time domain sample by the output unit 119, thereby yielding a noise suppressed version of the original signal from step 301.

The steps of the flowcharts of FIG. 3 and FIG. 4, as performed by the apparatus of FIG. 1, are implemented in a DSP (Digital Signal Processor), such as a DSP56166 available from Motorola, Inc.

In noise suppression systems based on the spectral subtraction technique, a bank of bandpass filters is often used for spectral analysis of the input speech signal. Unfortunately, these filters are imperfect and cause a degradation of the output speech quality even when the noise suppression is inactive, i.e., when the gains applied to the different frequency channels are set to unity as would be the case when the input noise level is low or not present. The speech quality degradation due to the filters is also present when the noise suppression is active (i.e., gains less than unity are applied) under higher input noise level conditions.

In this invention, the distortion caused by the filters is eliminated by the use of a FFT based spectral analysis technique combined with an overlap-add filtering technique, thereby improving the overall voice quality of the noise suppression system. Furthermore, the approach is computationally more efficient than the filter bank analysis technique.

What is claimed is:

1. A method comprising the steps of:
providing a signal that includes noise;
sampling the signal to provide a plurality of digital information samples;
grouping a predetermined number of the digital information samples as a set;
noise suppressing the signal by:
attaching at least one digital representation of silence at the beginning of the set to form an extended set;
performing a Fourier transform on the extended set to obtain a set of frequency domain coefficients;
scaling at least some of the set of frequency domain coefficients to provide a set of scaled frequency domain coefficients;
performing an inverse Fourier transform on the set of scaled frequency domain coefficients to provide a set of time domain samples;
partially overlapping in time the set of time domain samples with a previously formed set of time domain samples to produce at least one pair of overlapping time domain samples;
adding the at least one pair of overlapping time domain samples to provide at least one composite time domain sample;
providing non-overlapping time domain samples and the at least one composite time domain sample as a noise suppressed version of the signal.

2. The method of claim 1, wherein the step of providing a signal that includes noise includes the step of providing a signal comprising audio information that includes acoustic noise.

3. The method of claim 1, wherein the step of grouping a predetermined number of the digital information samples as a set includes the step of grouping a predetermined number of temporally contiguous digital information samples as the set.

4. The method of claim 1, wherein the step of scaling at least some of the set of frequency domain coefficients to provide a set of scaled frequency domain coefficients includes the step of scaling at least some of the set of frequency domain coefficients to provide a set of scaled frequency domain coefficients to facilitate noise suppression.

5. The method of claim 1, further comprising the step of attaching at least one digital representation of silence at the end of the set.

6. The method of claim 5, wherein the at least one digital representation of silence attached at the beginning of the set is the same length as the at least one digital representation of silence attached at the end of the set.

7. The method of claim 1, wherein the step of attaching at least one digital representation of silence includes the step of attaching a predetermined number of zero-valued samples that represent silence to the set to form the extended set.

8. The method of claim 1, wherein the step of performing a Fourier transform on the extended set to obtain a set of frequency domain coefficients includes the step of performing a fast Fourier transform on the extended set to obtain the set of frequency domain coefficients.

9. The method of claim 1, wherein the step of scaling at least some of the set of frequency domain coefficients to provide a set of scaled frequency domain coefficients includes the step of scaling all of the set of frequency domain coefficients to provide the set of scaled frequency domain coefficients.

10. The method of claim 1, wherein the step of scaling at least some of the set of frequency domain coefficients to provide a set of scaled frequency domain coefficients includes the step of using at least two different scaling factors to scale at least some of the set of frequency domain coefficients to provide the set of scaled frequency domain coefficients.

11. The method of claim 1, wherein the step of scaling at least some of the set of frequency domain coefficients to provide a set of scaled frequency domain coefficients includes the step of scaling each of the at least some of the set of frequency domain coefficients by a corresponding individually determined scaling factor to provide the set of scaled frequency domain coefficients.

12. The method of claim 1, wherein the step of performing an inverse Fourier transform on the set of scaled frequency domain coefficients to provide a set of time domain samples includes the step of performing an inverse fast Fourier transform on the set of scaled frequency domain coefficients to provide the set of time domain samples.

13. The method of claim 1, wherein the step of partially overlapping in time the set of time domain samples with a previously formed set of time domain samples to produce at least one pair of overlapping time domain samples includes the step of partially overlapping in time by a number of time domain samples that is substantially equal to a number of time domain samples in the at least one digital representation of silence.

14. The method of claim 1, wherein the step of partially overlapping in time the set of time domain samples with a previously formed set of time domain samples to produce at least one pair of overlapping time domain samples includes the step of partially overlapping in time by a number of time domain samples that is equal to a number of time domain samples in the at least one digital representation of silence.

15. A noise suppression unit comprising:

a sampler having an input coupled to receive a signal that includes noise and an output that provides a plurality of digital information samples that correspond to the signal;

an accumulator having an input that receives the plurality of digital information signals and having an output that provides a predetermined number of the digital information samples as a set;

an extender having an input that receives the set and an output that provides an extended set comprising at least one digital representation of silence attached to the beginning of the set;

a Fourier transform unit having an input that receives the extended set and an output that provides a set of frequency domain coefficients;

a scaler having an input that receives the set of frequency domain coefficients and an output that provides a set of scaled frequency domain coefficients;

an inverse Fourier transform unit having an input that receives the set of scaled frequency domain coefficients and an output that provides a set of time domain samples;

an alignment unit having an input that receives the set of time domain samples, a first output, and a second output that provides at least one pair of overlapping time domain samples, wherein one pair of the at least one pair of overlapping time domain samples comprises one sample of the set of time domain samples and one sample of a previously formed set of time domain samples;

an adder having an input that receives the at least one pair of overlapping time domain samples and an output that provides at least one composite time domain sample;

an output unit having a first input that receives the at least one composite time domain sample, a second input that receives non-overlapping time domain samples from the first output of the alignment unit, and an output that provides the non-overlapping time domain samples and the at least one composite time domain sample as a noise suppressed version of the signal.

16. The noise suppression unit of claim 15, wherein the noise suppression unit is disposed in a communication unit further comprising a transmitter.

17. The noise suppression unit of claim 15, wherein the extender provides an extended set comprising at least one digital representation of silence attached to the beginning of the set and at least one digital representation of silence attached to the end of the set.

18. The noise suppression unit of claim 15, wherein the at least one digital representation of silence attached to the beginning of the set is the same length as the at least one digital representation of silence attached at the end of the set.

* * * * *